United States Patent [19]

Peters, Jr.

[11] Patent Number: 4,631,449
[45] Date of Patent: Dec. 23, 1986

[54] INTEGRAL CRYSTAL-CONTROLLED LINE-VOLTAGE BALLAST FOR COMPACT RF FLUORESCENT LAMPS

[75] Inventor: Philip H. Peters, Jr., Greenwich, N.Y.

[73] Assignee: General Electric Company, Schenectady, N.Y.

[21] Appl. No.: 638,166

[22] Filed: Aug. 6, 1984

[51] Int. Cl.⁴ .......................................... H05B 37/00
[52] U.S. Cl. .................................... 315/205; 315/248
[58] Field of Search .............................. 315/205, 248

[56] References Cited

U.S. PATENT DOCUMENTS

| | | | |
|---|---|---|---|
| 4,048,541 | 9/1977 | Adams et al. | 315/248 |
| 4,060,752 | 11/1977 | Walker | 315/244 |
| 4,251,752 | 2/1981 | Stolz | 315/208 |
| 4,277,728 | 7/1981 | Stevens | 315/247 |
| 4,388,563 | 6/1983 | Hyltin | 315/209 R |
| 4,415,838 | 11/1983 | Houkes | 315/248 |
| 4,415,839 | 11/1983 | Lesea | 315/209 R |
| 4,471,269 | 9/1984 | Ganser et al. | 315/205 |
| 4,484,107 | 11/1984 | Kaneda | 315/244 |

Primary Examiner—Harold Dixon
Attorney, Agent, or Firm—Bernard J. Lacomis; James C. Davis, Jr.

[57] ABSTRACT

A ballast circuit for a fluorescent lamp including a rectifier-filter for coupling to an AC power supply to generate a DC voltage, an oscillator circuit coupled to said DC voltage for developing an RF oscillator signal, and switching signal means for developing concurrent oppositely phased switching signals at the frequency of said oscillator signal to drive series connected power transistors. The common output of the power transistors is coupled to energize a fluorescent lamp coil and regenerative feedback means for generating a signal to aid in switching the power transistors.

19 Claims, 1 Drawing Figure

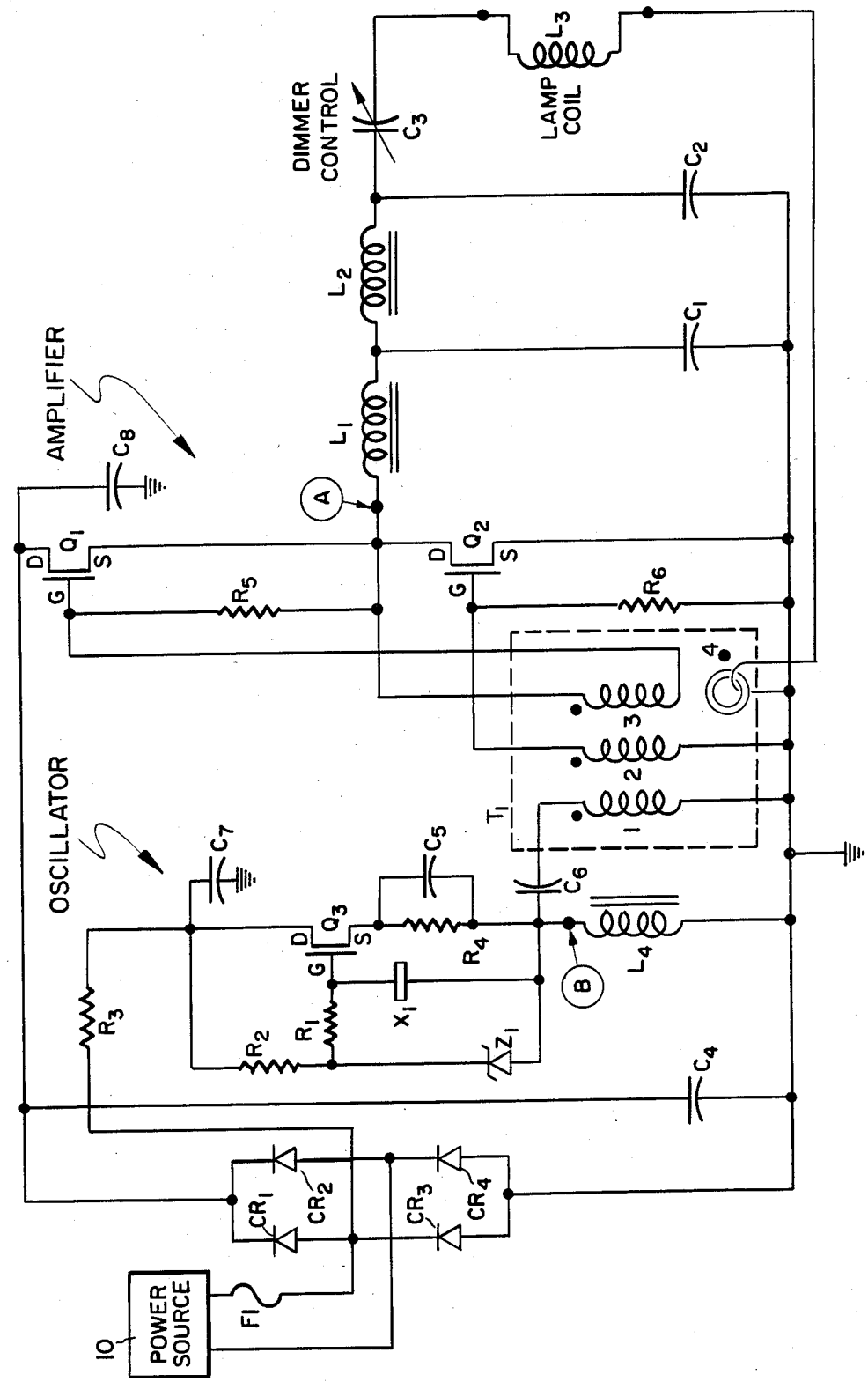

INTEGRAL CRYSTAL-CONTROLLED LINE-VOLTAGE BALLAST FOR COMPACT RF FLUORESCENT LAMPS

BACKGROUND OF THE INVENTION

The invention relates to a crystal-controlled line-voltage ballast for compact RF fluorescent lamps and more particularly to an integral high efficiency ballast circuit for operating electrodeless fluorescent lamps.

In recent years, lamp ballasts operating in the 100–150 kHz region have been successfully developed to start and run solenoidal electrodeless fluorescent (SEF) lamps. In such lamps a ferrite or air core coil is used to couple RF energy to the lamp discharge. With recent advances in high voltage FET (field effect transistor) technology it is possible to produce sinewave power at line voltage levels with high efficiency and at frequencies extending into the megahertz range. Higher frequency operation makes possible smaller, lighter weight, lower cost ballast circuitry which is especially attractive for an integral ballast and lamp package product.

Electromagnetic interference (EMI) generated by an SEF ballast includes the fundamental and its harmonic frequencies and is produced continuously while the SEF lamp is operating, and not momentarily merely to start the lamp as in conventional fluorescent lamp ballasts. Since there is no frequency band assigned to industrial, scientific and medical (ISM) use which includes the 100–150 kHz region, a ballast and lamp package operating in this region must be very well shielded to comply with FCC regulations governing electromagnetic radiation. Operation at a frequency assigned for ISM use would avoid the need to seek FCC approval to operate lamps at some frequency not presently set aside for such a commercial product. It would remain necessary to minimize RF interference with other electronic devices, such as radio and television receivers, which can easily be used within distances only a few inches from the lamp.

In view of the advances in high voltage FET technology, and the advantages inherent therefrom, as hereinbefore stated, an integral SEF lamp ballast which would operate at higher frequencies than those heretofore developed would be desirable. The physical size of the ballast circuitry would be small enough so that it could be conveniently and integrally packaged with an SEF lamp without excessively increasing the size of the lamp. Further, the ballast circuitry would be inexpensive relative to a low frequency ballast, and high volume production SEF lamps would become more economically attractive.

The efficiency (AC line power to RF power conversion) of the ballast should be high, say greater than about 70 percent, to minimize problems of heat sinking and thermal management. Further, the efficiency should not vary greatly over the range of expected line voltages, thus enabling the use of a smaller DC filter capacitance whereby the input power factor of the ballast is improved. Sufficient power must be provided to the lamp from the ballast to assure starting and re-starting of the lamp over the full range of expected ambient temperature. Further, provision for dimming the lamp and for readily adjusting the output impedance of the ballast circuitry to accommodate impedance variations among lamps of a similar type is desirable. Also, the output frequency of the ballast should be maintained relatively constant regardless of variations in impedance of the load (SEF lamp), supply voltage or temperature of the ballast.

Accordingly, it is an object of the present invention to provide a ballast for an SEF lamp wherein the output frequency of the ballast is in an ISM frequency band.

Another object is to provide a ballast capable of being integrally packaged with an SEF lamp.

Still another object is to provide a ballast having a dimmer control for an SEF lamp.

Yet another object is to provide a high efficiency ballast for an SEF lamp.

A further object is to provide a ballast for an SEF lamp wherein the output frequency of the ballast does not significantly vary as a function of load impedance, supply voltage and temperature of the ballast.

BRIEF SUMMARY OF THE INVENTION

In accordance with the present invention, a ballast circuit for a solenoidal electrodeless fluorescent (SEF) lamp comprises an oscillator circuit coupled to a DC supply for generating an RF oscillating signal and means responsive to the RF oscillating signal to develop separate switching signals of opposing phase to drive a pair of series connected RF amplifying power transistors, each of which has an input coupled to one of these switching signals. The pair of amplifying power transistors are connected to have a common output and are alternately gated to provide an RF output voltage at such common output to supply power to a fluorescent lamp coil. The RF oscillating signal is translated into oppositely phased switching signals by means of a transformer having oppositely poled secondary windings coupled to the power transistor inputs. A feedback coil is arranged to regeneratively couple a portion of the current in the lamp coil back to the transformer, and a variable capacitor is provided to selectively couple power from the ballast circuit to the lamp coil. The oscillator circuit includes a resonant circuit coupled to the inputs of the power transistors and tuned to the oscillator freuency. The resonant circuit which includes the reflected input capacitances of the power transistors provides the gate drive voltages to the power transistors.

The features of the invention believed to be novel are set forth with particularity in the appended claims. The invention itself, however, both as to organization and method of operation together with further objects and advantages thereof, may best be understood by reference to the detailed description taken in connection with the accompanying drawing.

BRIEF DESCRIPTION OF THE DRAWING

The only FIGURE of the drawing is a circuit diagram of a ballast manufactured in accordance with the present invention.

DETAILED DESCRIPTION

In view of the advantages of using a higher operating frequency for an SEF lamp and ballast configuration, applicant decided to develop an SEF (solenoidal electrodeless fluorescent) lamp ballast which would operate in the 13.56 MHz band, which is assigned to industrial, scientific and medical (ISM) use. This frequency and its first harmonic have historically been used in industrial applications, such as for RF heating. In addition, the second and third harmonics are similarly allocated for this use. Since these frequencies are reserved for industrial use, the level of EMI and incidental radiation from the ballast can be relatively much greater than would be allowed at frequencies not included within an ISM frequency band. This is of particular advantage in a lamp application at 13.56 MHz. Power can be transferred to the lamp discharge with good efficiency using only a small, solenoidal air-core coil made resonant at the operating frequency. With this coil geometry, the radiated fraction (leakage) of the total RF field is much larger than it is for a toroidal ferrite core and coil typically used in an SEF lamp which operates at 100 kHz.

When operating at about 13.56 MHz, FCC regulations require that the frequency of the RF voltage used to supply power to the lamp must be held within a deviation of plus/minus 6.78 kHz. Applicant has determined that this can most easily be accomplished by using crystal control of the ballast oscillator frequency.

Although the description and operation of the ballast of the present invention will be described for the 13.56 MHz band, it is to be understood that the results of the present invention may be accomplished at other frequencies by adhering to the principles taught and suggested by the present invention.

Referring to the FIGURE, a circuit for a ballast for operating an SEF lamp is shown. Diodes CR1-CR4 form a rectifying diode bridge supplied from power source 10, such as an AC line. One side of the source is connected through fuse F1 to the anode-cathode junction of CR1 and CR3, respectively, and the other side is connected to the anode-cathode junction of CR2 and CR4. The cathode junction of diodes CR1 and CR2 is connected to one (positive) side of filter capacitor C4, to bypass capacitor C8 and the drain D of field effect transistor (FET) Q1. The other (negative) side of filter capacitor C4 and the bypass capacitor C8 are each connected to the anode junction of diodes CR3 and CR4, corresponding to the local ground point of the ballast circuit. Capacitor C8 bypasses RF current from the drain D of FET Q1 to ground so that RF current does not flow through filter capacitor C4 and/or to power source 10. A DC supply voltage for the ballast circuitry is thereby established across filter capacitor C4 by the bridge rectifier comprising diodes CR1-CR4.

The positive side of the diode bridge is connected to the drain D of FET Q3 through dropping resistor R3. Filter capacitor C7 is connected between source S of FET Q3 and ground potential. FET Q3 may comprise a device like FET Q1, but of lower power rating, such as a metal-gate FET developed by Siliconix Corp., Santa Clara, California, or the like.

The source S of FET Q3 is connected to ground potential through the series combination of resistor R4 and inductor L4. Bypass capacitor C5 is connected in parallel across resistor R4. The junction of resistor R4 and inductor L4 is connected to ground potential through the series combination of coupling capacitor C6 and the primary winding of transformer T1. Capacitor C6 prevents DC current from flowing through and thereby saturating the primary winding of transformer T1. Transformer T1 comprises a trifilar wound (i.e., 3 windings, wound on the same core) transformer having a ferrite core. The phasing reference of the primary winding of transformer T1, as indicated by the heavy dot, is at the junction of capacitor C6 and the primary of transformer T1. Inductor L4, capacitor C6 and the input impedance seen across the primary coil of transformer T1 comprise a resonant circuit having a resonant frequency near the RF output frequency of the ballast circuitry. Thus, a sinusoidal RF voltage appears across the primary coil of transformer T1. A crystal resonator X1 is connected between the gate G of FET Q3 and the junction of resistor R4 and choke L4. The junction of dropping resistor R3 and filter capacitor C7 is connected to gate G of FET Q3 through R2 and R1. The cathode of a zener diode Z1 is connected to the junction of resistors R1 and R2 and the anode thereof is connected to the junction of resistor R4 and inductor L4. Zener diode Z1 ensures that high voltage is not applied to the gate G of FET Q3. Resistors R1, R2 and R4, zener diode Z1, crystal resonator X1, FET Q3, capacitors C5 and C6, and inductor L4 comprise a crystal controlled oscillator and cooperate to produce an RF sinusoidal voltage across the primary winding of transformer T1.

The first secondary winding of transformer T1 is connected between gate G of FET Q2 and ground potential and has a phasing reference as indicated by the heavy dot at the gate side of the winding. Resistor R6 is connected between gate G of FET Q2 and ground potential to aid in damping spurious oscillations when FET Q2 is turned on and off.

One side of the second secondary winding of transformer T1 is connected to gate G of FET Q1 and the other side of the second secondary winding of transformer T1 is connected to source S of FET Q1. The phasing reference of the second secondary winding of transformer T1, as indicated by the heavy dot, is connected to source S of FET Q1. Resistor R5 is connected between gate G and source S of FET Q1 to aid in damping spurious oscillations when FET Q1 is turned on and off.

Source S of FET Q1 and drain D of FET Q2 are connected together and this junction, switch point A, is connected to a first side of inductor L1. FETs Q1 and Q2 and the first and second secondary windings of transformer T1 comprise an alternately switched half-bridge amplifier for amplifying the RF power delivered via FET Q3 across the primary winding of transformer T1. Inductor L1 is thereby supplied with a square voltage waveform at switch point A.

Heat sinks for FET Q1 and FET Q2 should be provided with an insulating material which maintains a low capacitance between junction A and ground. That is, the insulating material used should present a high impedance to ground for DC and at the amplifier operating frequency and yet have a high thermal conductivity. A material such as beryllium oxide may be used. FET Q1 and FET Q2 may each comprise a power FET device such as a type IRF710, manufactured by International Rectifier Co., El Segundo, California, or the like. Each of power FET's Q1 and Q2 includes an intrinsic diode (not shown) which provides a path for conducting reverse current which flows when the load current (i.e., current to lamp coil L3) is not in phase with switch point A voltage.

The other side of inductor L1 is connected to ground potential through capacitor C1. Inductor L1 and capacitor C1 comprise one stage of a load matching and harmonic filtering network. Additional stages may be added as desired, such as a second stage comprising inductor L2 having an end connected to the junction of inductor L1 and capacitor C1 and the other end thereof connected to ground potential through capacitor C2. The value of components for the network should be selected to provide the required filtering for producing a sinusoidal output voltage and to optimize power transfer from the ballast circuitry to a lamp load. The junction of inductor L2 and capacitor C2 is connected to one side of DC blocking and tuning capacitor C3, which is preferably variable. The other side of capacitor C3 which constitutes the output of the ballast circuitry may be connected to one side of lamp coil L3.

The other side of the lamp coil L3 is connected to the negative rail of the DC power supply of the ballast circuit through a fourth winding of transformer T1 having a phase as indicated by the heavy dot. For instance, if transformer T1 includes a toroidal core, the current through the load, i.e., lamp coil L3, can be returned to the negative rail via a wire which first passes through the central hole of the toroidal core of transformer T1 and is then connected to the negative rail.

The operation of the ballast circuitry will now be described. The half-bridge amplifier comprises FETs Q1 and Q2 connected in series and driven by sinusoidal gate voltages of opposing phase from second and first secondary windings of transformer T1, respectively. The common junction or switch point A of FET's Q1 and Q2 is switched alternately from the positive rail (cathodes of CR1 and CR2) of the DC supply to the negative rail (anodes of CR3 and CR4) so that the voltage between switch point A and either rail is a biased square wave. This square wave voltage has a peak amplitude which is equal to or slightly less than the DC supply voltage, by an amount which depends upon the transistor (i.e., FET Q1 or FET Q2) on-resistance and switch point A current.

The load matching and harmonic filtering network comprises one or more LC sections and harmonic traps which convert the square wave voltage input available at switch point A to a sine wave of low harmonic content at the output of the network (i.e., input to capacitor C3). A two-stage network comprising circuit components L1, L2, C1, and C2 is shown in the FIGURE as an example. A nearly sinusoidal output voltage waveform from the ballast circuit is preferred to reduce radiated EMI from the lamp load at harmonic frequencies. The fundamental frequency of the ballast circuit output voltage provided to lamp coil L3 is determined by the frequency of the voltage supplied to the gate of FET Q1 and to the gate of FET Q2.

Capacitor C3 blocks the DC component of switch point A voltage from reaching lamp coil L3 and is tuned near resonance with lamp coil L3 at the operating frequency of the amplifier in order to transfer the highest output power from the ballast circuit to lamp coil L3. Typically, a high sinusoidal voltage near 1500 V peak-to-peak is produced across the coil L3 in order to initiate the discharge of the lamp (not shown). This voltage falls to a much lower level as soon as the lamp has started. The intensity of the light from the lamp can be dimmed by decreasing the value of capacitor C3 away from the near-resonance value so as to decrease the power supplied to lamp coil L3 by the ballast circuit.

Sinusoidal RF voltage for driving the half-bridge switch is produced across the primary winding of transformer T1 by a crystal controlled oscillator comprising RF transistor Q3 and crystal X1. The crystal-controlled oscillator supplies an RF current at the junction of inductor L4 and capacitor C6 (point B) to a resonant circuit comprising inductor L4, coupling capacitor C6, and the input impedance seen across the primary winding of transformer T1. The input capacitances of FET Q1 and FET Q2 are reflected in sum to the primary winding of transformer T1 to be in series with capacitor C6. The resonant current flowing through T1 must be large enough to produce a level of gate voltage for driving FET's Q1 and Q2 which will alternately turn each device into conduction as soon as the gate voltage exceeds the device gate threshold level. The resonant current is several times larger than the RF current supplied by FET Q3, and adequately high gate voltage for FET's Q1 and Q2 can be developed with a low power consumption in FET Q3 of about one watt.

The crystal controlled oscillator is supplied by a DC voltage obtained from a half-wave rectifier connection to a full-wave bridge comprising diodes CR1–CR4 at the anode of diode CR3 through dropping resistor R3. Power to FET Q3 can also be supplied by connecting R3 directly to the DC voltage across filter capacitor C4, except that considerably more power is dissipated in resistor R3 and FET Q3 using this alternate embodiment since the average voltage drop across R3 and Q3 is higher. In either case, the quiescent (non-oscillating) current through FET Q3 is made insensitive to supply voltage by the action of zener diode Z1 and resistors R4 and R2. The RF current supplied by FET Q3 is also insensitive to changes in DC supply voltage so that the gate drive voltage to FET's Q1 and Q2 is likewise made insensitive to DC supply voltage changes.

The circuitry between drain D of FET Q3 and point B (at the junction of resistor R4 and inductor L4) is self-oscillatory at the frequency of crystal X1. A portion of the RF voltage across crystal X1 is coupled to X1 via the interelectrode capacitances of FET Q3. Resistor R1 provides a series impedance to allow RF voltage to be developed across crystal X1 since the adjacent zener diode Z1 acts like a bypass capacitor at RF frequencies and would greatly reduce any RF voltage across crystal X1 if resistor R1 were not present.

The crystal-controlled oscillator circuit, including the resonant circuit at point B, produces a voltage of sufficient amplitude across the first and second secondary of transformer T1 to turn each of FET Q1 and FET Q2 on in alternating sequence for at least a portion of each half RF cycle to develop an output voltage across coil L3 sufficient to start the lamp. However, a higher respective sinusoidal gate voltage is required to keep each of FET Q1 and FET Q2 fully turned on over most of each respective RF half cycle so that the ballast will operate with good efficiency and at a power level close to that for which the transistors are rated for switching service. Additional power to drive the gate capacitances to a higher voltage is required. The overall ballast efficiency is significantly reduced if this additional power is supplied only by the oscillator. Efficiency suffers as a result of increased power loss in dropping resistor R3 and because the crystal-controlled oscillator circuit is not highly efficient.

In this invention the additional gate drive power for the half-bridge amplifier which is needed to operate the ballast circuit at high efficiency is provided by feeding back a portion of the RF power output to the inputs of the power transistors. This is preferably accomplished by returning the current from lamp coil L3 through a fourth or feedback winding of transformer T1.

The polarities of the first and second secondary windings of transformer T1 are such that the voltage induced in the first secondary winding and supplied to gate G of FET Q2 turns FET Q2 on and the voltage induced in the second secondary winding and supplied to gate G of FET Q1 turns FET Q1 off during the period when lamp current is flowing through lamp coil L3 toward the negative rail. Therefore, the feedback connection from the lamp coil L3 to transformer T1 is regenerative.

The amplifier will not start to oscillate in the absence of RF voltage from the crystal controlled oscillator. However, when the RF voltage at the primary winding of transformer T1 is made sufficient to turn on FET's Q1 and Q2 by the turning on of the crystal controlled oscillator, the amplifier will begin to produce both output power and feedback gate drive power. The amplifier output is held close to the unloaded crystal frequency by the component of current from the crystal oscillator which is supplied from point B to the gate drive transformer T1.

When the input drive voltage is sufficient, the regenerative feedback of lamp current from lamp coil L3 to transformer T1 causes the half-bridge amplifier to run as a power oscillator whose free-running frequency is governed mainly by the reactive components of the output network and the interelectrode capacitances of the amplifier transistors. The ballast output frequency is a function of the difference between the free-running frequency of the power oscillator and the free-running frequency of the crystal oscillator. The operating frequency is a function of the relative magnitude and phase of the current-feedback voltage from lamp coil L3 with respect to the crystal oscillator voltages which are developed across the windings of transformer T1. It is found that for a given output network the free-running amplifier frequency is lower than the free-running crystal oscillator frequency and voltage-tunes upwardly with increasing supply voltage as power supplied to lamp coil L3 is increased.

When the ballast circuit output is connected to a discharge type lamp (not shown), the act of simply touching the glass envelope with a hand places a small capacitive load across the lamp coil L3 and increases the phase angle of the current through lamp coil L3 with respect to the voltage at switch point A. This causes an advance in the phase of the gate signal to FET Q1 so that power delivered to the lamp from the ballast circuitry is increased. In practice, it is found that the power increase just compensates the additional loading and that the change in light level from the lamp is almost imperceptible. If the ballast amplifier is fully driven but no current feedback from lamp coil L3 is used, the light output from the lamp decreases when such additional loading is applied to the lamp.

Changes in lamp loading cause small changes in operating frequency to compensate for corresponding changes in phase referenced from the switch point A voltage to the voltage applied to either the gate of FET Q1 or FET Q2. The changes in frequency are typically held within 2 kHz by the frequency-locked loop action resulting from the regenerative feedback of lamp current. The frequency stability of the system with respect to changes in load as well as in line voltage is improved by increasing the amplitude of the crystal oscillator current which circulates in the primary winding of transformer T1.

It is found further that the magnitude of the sinusoidal current through lamp coil L3 tends to remain constant over a wide range of supply voltage from power source 10 when the ballast is operated with a discharge lamp load. This effect is due in part to the rise in discharge resistance with increasing lamp power. Also, the gate drive level changes very little with supply voltage due to the constant current action of the crystal oscillator portion of the circuit as heretofore described. This is an important advantage of the circuit since the gates of FET's Q1 and Q2 do not become starved of drive voltage at low input voltages from power source 10. Such an occurrence would quickly overheat and destroy the transistors.

It is evident that the crystal used in the ballast circuit could be cut to a slightly higher frequency in order to center the operating frequency range of the ballast amplifier at 13.56 MHz.

Depending on lamp and ballast circuit component values, the AC ripple at low DC supply voltage could cause the ballast circuitry output frequency to swing outside allowable limits during intervals when the phase of the ripple voltage is such that it subtracts from the supply voltage. This frequency sensitivity at low supply voltage limits the minimum size of filter capacitor C4 which can be used, and thus determines the maximum input power factor of the ballast circuitry which can be attained.

Thus has been illustrated and described lamp ballast circuitry having a high efficiency wherein the output frequency of the ballast is in an ISM band and can be held within allowable limits of the ISM band against changes in lamp load impedance, ballast supply voltage and temperature of the ballast circuitries. Further, the ballast circuitry has a dimmer control and may be integrally packaged with an SEF lamp.

While only certain preferred features of the invention have been shown by way of illustration, many modifications and changes will occur to those skilled in the art. It is to be understood that the appended claims are intended to cover all such modifications and changes as will occur to those skilled in the art.

What is claimed is:

1. A ballast circuit for a fluorescent lamp comprising:
   a rectifier-filter means adapted for coupling to an AC power source to generate a DC voltage,
   an oscillator circuit coupled to said DC voltage for developing an RF oscillator signal,
   switching signal generating means response to said oscillator signal to develop concurrent oppositely phased switching signals at the frequency of said oscillator signal,
   series connected power transistors having inputs coupled to said switching signals, said transistors having a common output, a fluorescent lamp energization coil coupled to said common output,
   said switching signal generating means including feedback means for regeneratively feeding back a portion of the current in said coil to aid in switching said power transistors whereby said transistors develop an RF power output signal at said common output to drive said coil, said power output signal being in the form of a square wave, and
   a filter circuit coupled intermediate said common output and said coil to transform said square wave to a sinusoidal wave.

2. The combination recited in claim 1 wherein said RF oscillator circuit operates at approximately 13.56 MHz.

3. The combination recited in claim 1 wherein said oscillator circuit includes an RF crystal.

4. The combination recited in claim 1 wherein said switching signal generating means includes a transformer having a primary winding and first and second oppositely phased secondary windings, said primary winding coupled to said oscillator signal and said first and second secondary windings coupled to said inputs of said transistors.

5. The combination recited in claim 4 wherein said feedback means includes a third secondary winding on said transformer, said third secondary winding coupled to said coil to generate a regenerative feedback signal for combination with signals in said first and second secondary windings via transformer action to switch said power transistors.

6. The combination recited in claim 4 wherein said power transistors are field effect transistors and said first and second secondary windings are each coupled to a gate electrode of one of said power transistors.

7. The combination recited in claim 1 further including a variable capacitor coupled intermediate said filter circuit and said coil for varying the portion of said power output signal applied to said coil.

8. The combination recited in claim 1 wherein said filter circuit comprises an L-C filter.

9. The combination recited in claim 1 wherein said power output signal has a peak amplitude substantially equal to said DC voltage.

10. A ballast circuit for a fluorescent lamp comprising:
   rectifier-filter means adapted for coupling to an AC power source to generate a DC voltage,
   an oscillator circuit coupled to said DC voltage for developing an RF oscillator signal, said oscillator circuit including a resonant circuit tuned to the frequency of said oscillator circuit,
   switching signal generating means including a portion of said resonant circuit responsive to said oscillator signal to develop concurrent oppositely phased switching signals at the frequency of said oscillator signal,
   series connected power transistors, each of said transistors having a separate input, said transistors having a common output,
   means for coupling said switching signals to said separate inputs of said transistors to develop an RF power output signal at said common output, said power output signal being in the form of a square wave,
   a fluorescent lamp energization coil driven by said RF output signal, and,
   a filter circuit coupled intermediate said common output and said coil to transform said square wave to a sinusoidal wave.

11. The combination recited in claim 10 wherein said RF oscillator circuit operates at approximately 13.56 MHz.

12. The combination recited in claim 10 wherein said oscillator circuit includes an RF crystal.

13. The combination recited in claim 10 wherein said switching signal generating means includes a transformer having a primary winding and first and second oppositely phased secondary windings, said primary winding coupled to said oscillator signal and said first and second secondary windings coupled to said inputs of said transistors.

14. The combination recited in claim 13 wherein said power transistors are field effect transistors and each of said secondary windings is coupled to a gate electrode of one of said power transistors.

15. The combination recited in claim 13 wherein said transformer includes a third secondary winding, said third secondary winding coupled to said coil to generate a regenerative feedback signal for combination with signals in said first and second secondary windings to aid in switching said power transistors.

16. The combination recited in claim 10 wherein said filter circuit comprises an L-C filter.

17. The combination recited in claim 10 further including a variable capacitor coupled to said filter circuit and said coil for varying the portion of said power output signal coupled to said coil.

18. The combination recited in claim 10 wherein said switching signal generating means includes means for regeneratively feeding back a portion of the current in said coil to aid in switching said power transistors.

19. The combination recited in claim 10 wherein said power output signal has a peak amplitude substantially equal to said DC voltage.

* * * * *